United States Patent [19]

Duncan

[11] Patent Number: 4,917,912

[45] Date of Patent: Apr. 17, 1990

[54] METHOD OF MAKING A LOW FAT FOOD ITEM HAVING THE TASTE AND FLAVOR OF A FRIED FOOD PRODUCT

[76] Inventor: Carolyn L. Duncan, 7490 E. 400 N., Kokomo, Ind. 46901

[21] Appl. No.: 339,877

[22] Filed: Apr. 18, 1989

Related U.S. Application Data

[63] Continuation of Ser. No. 231,992, Jun. 27, 1988, abandoned, which is a continuation-in-part of Ser. No. 879,083, Jun. 26, 1987, abandoned.

[51] Int. Cl.$^5$ ............................................. A23L 1/315
[52] U.S. Cl. .................................... 426/291; 426/296; 426/303; 426/644
[58] Field of Search ............... 426/296, 291, 293, 652, 426/643, 644, 523, 302, 804, 303, 304

[56] References Cited

U.S. PATENT DOCUMENTS

| | | | |
|---|---|---|---|
| 4,154,861 | 5/1979 | Smith | 426/466 |
| 4,208,442 | 6/1980 | Evans | 426/296 |
| 4,518,618 | 5/1985 | Hsia | 426/262 |

OTHER PUBLICATIONS

Tracy 1953 Marian Tracy's Complete Chicken Cookery Bobbs-Merrel Company, Inc., New York, pp. 43 and 120.
Bourque 1978 Country Kettle Microwave Cookbook, Cookbook Publishers, Inc., Kansas p. 49.
Olney 1978 Poultry Time-Life Books, Alexandria, VA, pp. 14–15.
Claessens 1984 Healthy Cooking, Rodale Press, Emmaes, PA, pp. 90–91.

*Primary Examiner*—Carolyn Paden
*Attorney, Agent, or Firm*—Shlesinger & Myers

[57] ABSTRACT

A method of making a low fat food item having the taste and flavor of a fried food product is disclosed. The food item is first wetted and then coated with a breading mixture. After spraying the food item with a mist of water until the breading composition appears sticky, the product is ready for cooking. The food item is then placed in a cooking tray and hot gas jets are directed against to coated surface of the food item at a temperature of 375°–475° F. for a time of 11–25 minutes. After cooking the food item is sprayed with a mist of water to turn the item uniformly brown. Food which has been cooked by this method can then be vacuum packed and retains its flavor for an extended period of time.

12 Claims, 1 Drawing Sheet

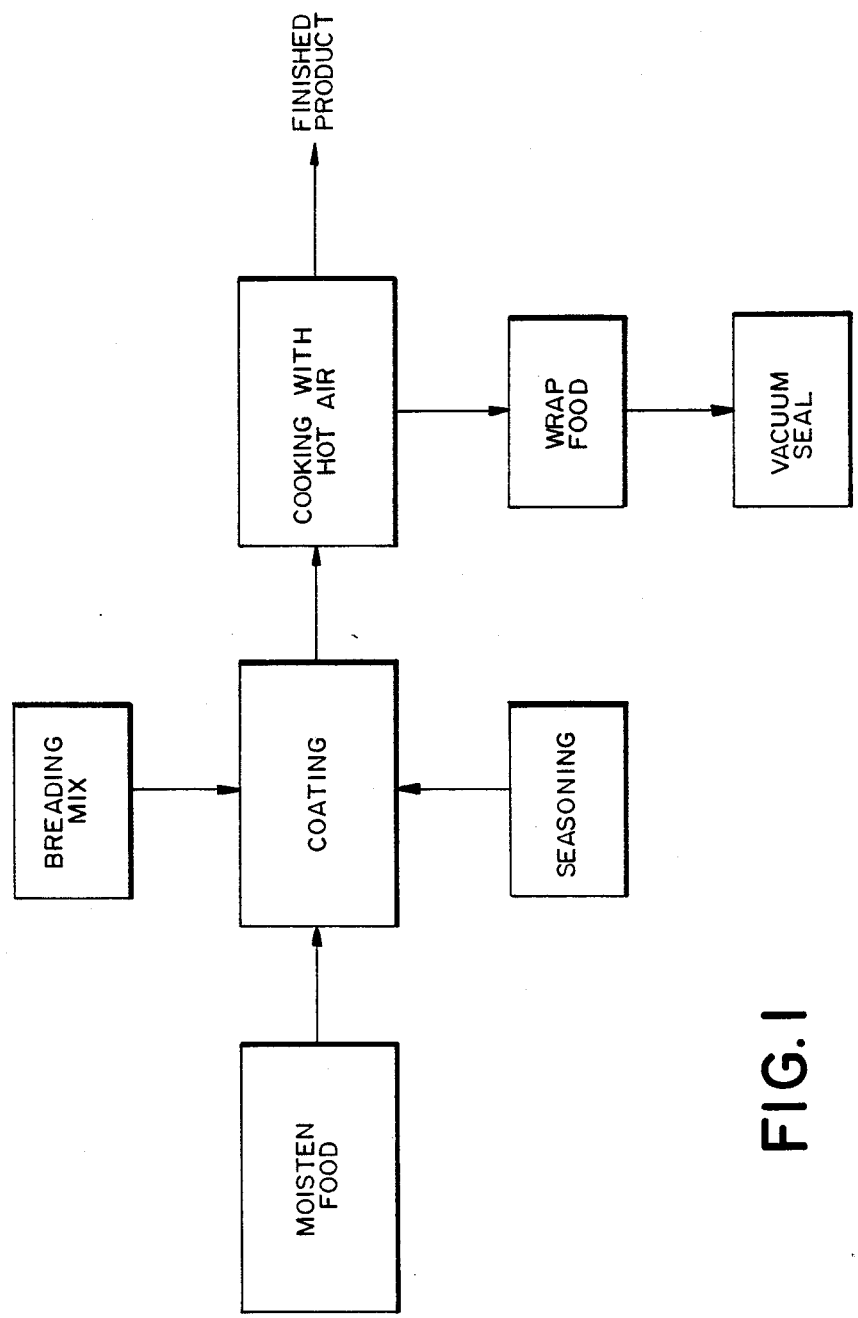

METHOD OF MAKING A LOW FAT FOOD ITEM HAVING THE TASTE AND FLAVOR OF A FRIED FOOD PRODUCT

This application is a continuation of Ser. No. 213,992 filed June 27, 1988, now abandoned, which is a continuation-in-part of patent application Ser. No. 879,083, filed June 26, 1987, now abandoned.

BACKGROUND OF THE INVENTION

The present invention relates to methods, and particularly to a method for cooking chicken, red meat, fish, seafood or the like by the use of hot air rather than by broiling, boiling or frying, and then vacuum packaging.

A variety of methods and apparatus have been used for cooking food items such as chicken, fish, seafood, and red meat. A common method of preparation is to apply a coating of flour or breading to such food items prior to cooking the item by broiling or frying. This coating yields a pleasing appearance and taste for the food.

However, it has been recognized that certain disadvantages result from cooking foods in this manner. In particular, many such cooking techniques employ an oil or grease which contacts the food and remains at least partially on the food. The result can be a "greasy" feel or taste to the food which is not desirable. Also, there are certain health considerations due to the presence of such greasy material, both as to dietary considerations and physiological consequences of such material being a part of the food intake.

There has also been a variety of cooking apparatus employed in the preparation of foods, including broilers, fryers, conventional ovens and convection ovens. For example, in U.S. Pat. No. 4,154,861, issued to Smith on May 15, 1979, there is disclosed a heat treatment of food products in which jets of heated gaseous fluid are perpendicularly directed against the surface of a food product. This apparatus includes a conveyor system upon which the food product is moved relative to the perpendicularly-directed jets. The apparatus of the Smith patent further includes a microwave source to provide the internal cooking associated with microwave ovens. A further discussion of various prior art cooking methods and equipment is contained in the Smith patent, and this discussion is incorporated by reference.

SUMMARY OF THE INVENTION

In one aspect of the present invention there is provided a method of cooking a food item by wetting the surface of the food item with water, applying to the wetted surface a flour mixture, removing excess amounts of the flour mixture from the surface, placing the food item into a cooking container, and directing jets of hot air against the surface of the food item to provide desired cooking of the food.

In another feature it has been found that food cooked in association with the hot gas jets and then vacuum packaged retains its flavor for an unusually long period of time.

FIG. 1 illustrates a flow chart for a procedure for preparation of a food within the scope of the present invention.

DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended, such alterations and further modifications in the method, and such further applications of the principles of the invention being contemplated as would normally occur to one skilled in the art to which the invention relates.

In accordance With the present invention, a variety of food items may be prepared with an advantageous flavor, texture and appearance. A preferred food item for use in this method is chicken but not to ice pack chicken, rather than frozen chicken, has been found to yield better results. Marination of the chicken is not necessary, and in fact is undersirable in conjunction with the present method. A whole chicken is preferable for starting, and can be cut as desired prior to cooking. Other food items suitable for use in the present method would include fish, seafood and other foods for which surface coatings are desirable. Catfish, for example, becomes a delicacy when prepared as set forth herein when cooked and packaged by vacuum processes red meat can be used.

The present method utilizes a cooking apparatus which includes a series of jets which direct hot air or other gaseous material against the surface of the prepared food item. A suitable cooking apparatus is a Wear-Ever Impinger II by Lincoln Mfg. Co., Inc. of 1111 N. Hadley Road, Fort Wayne, Ind. The literature on that oven includes the number of U.S. Pat. No. 4,154,861, issued to Smith on May 15, 1979. The information which exists on that oven, and the descriptions contained in the Smith patent are hereby incorporated by reference. Generally, the method of the present invention employs a cooking apparatus which can direct hot air jets against the surface of the food item to permit cooking of the food without the use of oils, greases, or the like. The hot air jets are at a temperature from about 375° F. to 475° F., and preferably at a temperature of about 415° F. Also, the food item is preferably moved relative the air jets to assure even cooking of the food. The directing of hot gas jets against the food item enables a more even and efficient application of cooking heat to the food surface, and this action is enhanced by moving the food relative the jets. As disclosed in the Smith patent, a convenient means for providing this relative movement is to convey the food along a belt or the like in a direction normal to the direction of the air jets.

The food item is prepared as shown in the FIGURE. The surface of the food with water, preferably by dipping the food into fresh water. The food, such as chicken, is then lifted out of the water and allowed to drain of excess water. A flour mixture "breading" containing flour and an assortment of herbs and/or spices, selected primarily as a matter of taste preference, and without any shortening, hydrogenated or non-hydrogenated, is prepared and sifted. The flour mixture is then applied to the wetted chicken surface in conventional fashion by dumping the chicken in a breading lug containing the flour mixture, and covering the chicken with the flour mixture by hand, making sure that the chicken is covered. Excess amounts of the flour mixture are gently knocked off and the chicken is placed in a rack or tray for cooking.

Using plain water, and a spray bottle with a misting adjustment on the nozzle, for example, light spraying of the chicken coated with the four mixture is desirable until the flour mixture appears sticky or pasty, not runny. Overspraying of the flour mixture should be avoided to prevent the spraying from washing off the flour mixture. A light misting with plain water works best. In some instances the flour mixture will already appear sticky upon application, and spraying is not necessary to obtain this effect.

The cooking apparatus is set by preheating the cooker for 10-15 minutes to the desired cooking temperature. The oven temperature should be in the range of about 375° to about 475°. A cooking temperature of 415° is preferred. Cooking time will vary in part upon the size of the food pieces, but generally should be in the range of about 11 to about 25 minutes. Chicken parts from a three pound chicken, for example, are preferably cooked for a period of about 19½ to 20 minutes. Cooking oils and fats are not used at any time in the "breading" or otherwise, on the chicken. The food item may also be sprayed with a mist of water after cooking to turn the food a golden brown color in any spots that were too dry before going into the cooking apparatus.

In the case of a cooking apparatus including a conveyor system for movement of the food relative the hot gas jets, the cooking time is conveniently set by controlling the speed of the conveyor. Thus, a shorter cooking time will entail a faster conveyor speed, and a longer cooking time will require a slower conveyor speed.

In using a cooking apparatus such as described in the Smith patent previously referenced, care must be taken to locate the food properly. Centering of the cooking trays will ensure that the trays will not catch on the sides of the cooker as the conveyor proceeds, and slowing of the trays relative the intended cooking time will thus be avoided. Also, proper location of the cooking trays will ensure proper operation of the cooking apparatus by guaranteeing that the hot gas jets properly impinge upon the food items. But the microwave feature of the aforementioned Smith patent apparatus is not used and not needed with my cooking method.

In accordance with this cooking method, the food items are provided with a coating which is of a desired taste and appearance. The avoidance of cooking shortening eliminates the disadvantages associated with such materials. The cooking process is fast and efficient.

Where the food to be cooked is chicken, the chicken can be cut into nine pieces, namely: two wings; two ribs (side breasts); center breast; two thighs; and two legs. This is done before the dipping in water. In accordance with a second example of the invention, a chicken can be cooked without the skin. In an example of the skin-off method, all of the steps recited above can be followed. However there is an additional step at the very beginning, before the aforesaid first wetting with water. This is the step of removal of the skin of the chicken. It is done before the dipping in water, and simply involves pulling the skin off all of the chicken pieces except the wings. Then the procedure is followed as described above. It has been found in tests that the cooking without the skin enables use of less seasonings. Also, it believed that most chicken fat is on or immediately under the skin. By removal of the skin and fat immediately under it, this skinless cooking procedure is particularly helpful in cooking for persons who must carefully limit their fat intake. Again, no cooking oils or fats are used in the breading or otherwise, on the chicken. Nevertheless, the resluting cooked chicken tastes like fried chicken.

In accordance with another feature of the present invention chicken was prepared with a mildly seasoned breading as previously described and cooked as also previously described. Immediately after cooking it was vacuum packaged and placed in a refrigerated room. Drumsticks were prepared on May 23, 26, and 30 and on June 1 and 4. These drumsticks were vacuum packaged and stored until June 8 when they were each compared with drumsticks cooked and packaged on June 7.

Evaluation of the samples was made by a panel of twelve people familiar with the taste of fried chicken. Each panelist was given a plate with three pieces of chicken, one from either June 7 or from stored meat and the other two pieces from the opposite source. The panelists were asked to identify the sample that was different from the other two; to indicate degree of difference; and to indicated preference for the odd sample or the pair of samples. All chicken was heated in a microwave oven in the packages just prior to serving.

TABLE I

CORRECTED SELECTION OF ODD SAMPLE, LEVEL OF STATISTICAL SIGNIFICANCE AND NUMBER PREFERRING THE CORRECTLY IDENTIFIED STORED SAMPLE

| TOTAL | DATE OF PREPARATION | CORRECT SELECTION | PREFERRED STORED | SIGNIFICANCE |
|---|---|---|---|---|
| 12 | May 23 | 5 | 0 | N.S |
| 12 | May 26 | 8 | 2 | 5% |
| 12 | May 30 | 6 | 3 | N.S. |
| 11 | June 1 | 5 | 3 | N.S. |
| 12 | June 4 | 1 | | N.S. |
| 59 | All Dates | 25 | 8 | N.S. |

The results overall indicate no significant differences and almost one-third of the correct selections preferred the storage product. This supports the conclusion of no differences among the several dates of preparation and emphasize the long term storage capability of food prepared by the invention method.

The fact that no warmed-over flavor developed is unusual and this result could possibly in part due to reduction of oxygen content in the package immediately after cooking but with presently accepted explanations of warmed-over flavor, other unexpected factors must be involved.

It has subsequently been found that the hot air process and vacuum packaging can also be to prepare other meats such as steak, hamburger or pork chops. Cooked with hot air than vacuum sealed the product retains a fresh cooked taste the same as the chicken. No other procedure is known to get these results.

While the invention has been described in detail in the foregoing description, the same is to be considered as illustrative and not restrictive in character, it being understood that only the preferred embodiment has been described and that all changes and modifications that come within the spirit of the invention are desired to be protected.

The invention claimed is:

1. Method of cooking a food item having a low fat content and the taste and flavor of a fried food product, said method comprising the steps of:
    (a) moistening the surface of the food item with water;
    (b) thoroughly coating the wet surface with a breading composition including flour, milk, egg and seasoning, but excluding ay shortening or coloring agent;
    (c) spraying the coated item with a mist of water until said breading composition appears sticky;
    (d) placing the coated food item into a cooking chamber;
    (e) directing hot gas jets against the coated food item for a period sufficient to cook and turn the food item brown;
    (f) removing the cooked food item from said cooking chamber; and
    (g) spraying the cooked food item with a mist of water to turn the item uniformly brown throughout the surface thereof.

2. The method of claim 17, wherein: said hot gas jets are at a temperature from about 375° F. to 475° F.

3. The method of claim 2, wherein: said period for cooking the food item is from about 11 to 25 minutes.

4. The method of claim 1, and including the step of: moving the coated food item simultaneously with step (e) and relative to said hot gas jets.

5. The method of claim 1, wherein: prior to moistening the surface of the food item with water of step a, the skin is removed therefrom.

6. The method of claim 1, wherein:
the food item is chicken;
prior to moistening the surface of the food item with water of step a, the chicken is cut into nine pieces; and
said nine pieces include two wings, two breast, a back, two thighs, and two legs.

7. The method of claim 1, wherein:
the coated food item obtained in step c is placed on a cooking holder;
said cooking holder carrying the food item is then placed on a conveyor; and
said cooking holder is moved relative to said hot gas jets.

8. The method of claim 1, wherein:
said hot gas jets are at a temperature of about 415° F. and said period for cooking is about 18.5 minutes.

9. The method of claim 1, and including the step of: wrapping the brown cooked food item after step g in an impervious covering and vacuum sealing the same.

10. The method of claim 1, wherein:
said breading composition includes about 1-10% milk products, 1-10% egg, and 0-10% seasonings incorporated in a flour base.

11. The method of claim 10, wherein:
said milk products and said egg are each powdered.

12. The method of claim 10, wherein:
said breading composition includes salt.

* * * * *